United States Patent [19]

Eng et al.

[11] Patent Number: 4,476,654
[45] Date of Patent: Oct. 16, 1984

[54] SPLINE GEAR RECIPROCATING LAPPING MACHIE

[75] Inventors: Berwyn S. Eng; Earl L. Christian, both of San Diego, Calif.

[73] Assignee: The United States of America as represented by the Secretary of the Navy, Washington, D.C.

[21] Appl. No.: 410,275

[22] Filed: Aug. 23, 1982

[51] Int. Cl.³ .............................................. B24B 15/08
[52] U.S. Cl. ........................................... 51/26; 51/67; 51/92 ND
[58] Field of Search ............... 51/26, 2 R, 34 H, 34 J, 51/34 K, 34 R, 59 R, 67, 92 ND, 165.9, 165.93; 269/63, 67–70; 83/639

[56] References Cited
U.S. PATENT DOCUMENTS

| | | | |
|---|---|---|---|
| 1,467,985 | 9/1923 | Schurr | 51/123 G |
| 1,976,818 | 10/1934 | Ward | 51/95 LH |
| 2,292,588 | 8/1942 | Terbrueggen | 51/92 ND |
| 2,307,637 | 1/1943 | Praeg | 51/26 |
| 2,704,672 | 3/1955 | Wiltsie et al. | 269/70 |
| 2,840,958 | 7/1958 | Waller | 51/95 LH |
| 3,247,622 | 4/1966 | Hackman, Jr. | 51/34 H |
| 3,367,069 | 2/1968 | Mickas | 51/232 |
| 4,341,137 | 7/1982 | Leitch et al. | 83/639 |
| 4,368,596 | 1/1983 | Wada et al. | 51/165.9 |

Primary Examiner—Frederick R. Schmidt
Assistant Examiner—Matthew D. Daschel
Attorney, Agent, or Firm—Robert F. Beers; Ervin F. Johnston; Edmund W. Rusche, Jr.

[57] ABSTRACT

An apparatus is presented which will automatically lap involute and straight internal or external gear splines. Lapping force is applied alternatively to the left and right side of each tooth flank. Automatic indexing to new radial positions about the circumference of a gear after any preselected number of lapping cycles accomplishes the application of equal lapping forces to each tooth.

The apparatus comprises a bed or support frame upon which is mounted a headstock assembly and a tailstock assembly. Mating workpieces, e.g., mating involute or straight internal or external gear splines, are fastened through collets to the mechanisms of the headstock and tailstock assemblies. The tailstock assembly includes a mainshaft attached to the collet holding its workpiece. The mainshaft is driven by a pneumatic piston to reciprocate along the axis of the workpiece causing the workpieces to lap one another. Equal lapping force to each tooth flank is maintained during lapping cycles by a clutch mechanism which transfers a torque along the mainshaft to the workpiece held by the mainshaft as it laps against its mating workpiece held by the headstock assembly.

The headstock assembly consists of a transmission which is connected to an indexing mechanism which, between each separate lapping operation, will rotate the workpiece held by the headstock collet an angular distance equal to one tooth spacing. Rotation through increments of one tooth spacing occur automatically after each individual lapping operation until the mating gears have been lapped against one another in all possible orientations between their respective teeth positions.

The apparatus produces smooth and consistent gear tooth finishes in a rapid time since the lapping machine maintains proper centerline alignment between mating spline parts throughout all phases of the lapping operations.

14 Claims, 8 Drawing Figures

SPLINE GEAR RECIPROCATING LAPPING MACHIE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Means for transmitting torque in mechanical devices have always been of great importance. Often, several devices, e.g., axles, must use connectors to transmit torque from one axle to the other or to any third body. Connection means for transmitting torque include gearing, slot and key connections, rigid fastenable couplings, clutch or friction couplings, etc.

Spline gears are an important torque transferring device. Large torque components may be transferred via a spline gear connection. In addition, spline gear connections provide the capability of disengaging or engaging the torque transmission at the desire of the operator.

The performance of spline gears is dependent upon the precision with which they are prepared. The performance of precision spline gears can be hindered by the presence of excessive friction between the mated spline parts. Interchangeability between lot sizes of production spline parts can be affected by spline tolerances. Undesirable friction may be the result of surface irregularities, burrs, galling, poor or inadequate machining techniques.

Methods of finishing the surfaces of spline gears to a precision necessary for their smooth and dependable operation are generally limited to a polishing type procedure known as lapping. Hand lapping is the traditional method applied. Hand lapping is accomplished by mating the female portion with the male portion of the gear, or mating either gear with what is known as a tool which, in reality, is nothing more than the opposite embodiment of the gear. Using a very fine grinding or polishing compound, hand lapping is accomplished by reciprocally sliding the first piece against the second piece, or by sliding the gear in and out of the tool piece.

Hand lapping spline parts removes friction, thereby increasing the performance. However, hand lapping operations are inconsistent, monotonous and extremely time-consuming.

SUMMARY OF THE INVENTION

The present invention addresses the general problem of lapping spline gears. In particular, a spline gear reciprocating lapping machine which automatically laps involute or straight internal or external gear splines is presented.

The apparatus is comprised of a tailstock assembly and a headstock assembly which are attached to a main support frame. The headstock assembly is attached to the support frame in a fixed manner. The tailstock assembly is movably attached to the support frame so that it may be moved along an axis common to both assemblies and the spline gears being lapped.

The spline gear workpieces are fastened in the headstock and tailstock assemblies by means of appropriate collets. One is fastened in the headstock assembly with its mating opposite fastened in the tailstock assembly. The workpieces may be fastened in the headstock and tailstock assemblies in alternative orientations depending on the operator's purpose.

The headstock assembly holds its workpiece in a firm manner during the lapping process. The assembly is configured to rotate its workpiece about its axis so that between each lapping period the workpiece may be indexed a rotational amount equal to the movement through one gear tooth spacing. Consequently, the workpiece is lapped for each gear tooth spacing through at least an entire revolution about its axis.

The tailstock assembly holds its gear workpiece with its axis colinear with the axis of the gear workpiece fixed in the headstock assembly. At the start of a lapping cycle, the tailstock housing moves forward to engage the two workpieces. Automatic lapping is activated wherein a means attached to the tailstock housing moves reciprocatingly along the colinear axis of the mating workpieces causing sliding of one over the other. This process will occur for a set time for each tooth spacing. At the end of such set time, the tailstock system withdraws its workpiece from contact with the mating workpiece held by the headstock assembly and allows the headstock assembly to index its workpiece one tooth spacing. This process is repeated until a complete lapping cycle has occurred.

The timing and coordinating control of the operating system is accomplished through a pneumatic system. The pneumatic system also supplies the working energy for lapping the spline parts. Consequently, this pneumatic system is the heart of the spline gear reciprocating lapping machine. It is a compressed air system composed of a network of lines, pressure regulators, air valves, limit control switches and piston driven reciprocating cylinders.

The prime advantages of the spline gear reciprocating lapping machine are its speed in lapping operations, its uniform and consistent tooth finishes, its automatic indexing feature for providing positive sequential indexing to any number of radial positions for the workpieces, proper workpiece alignment throughout the lapping operation, and the ability to lap straight internal and external splines as well as involute splines with a defined spiral lead angle rate.

OBJECTIVES OF THE INVENTION

An objective of the invention is to provide a machine for automatically lapping spline gears.

A second objective of the invention is to provide a lapping machine for automatically lapping involute and straight internal or external gear splines.

A further objective of the invention is to provide a lapping machine which produces uniform, consistent tooth finishes in a rapid period of time.

A further objective of the invention is to present a reciprocating lapping machine which automatically indexes the workpieces relative to one another between lapping cycles to provide positive, sequential indexing to any number of radial positions.

Another objective of the invention is to present a reciprocating lapping machine which automatically indexes the relative radial orientation between the workpieces through any preselected number of cycles and which accomplishes the lapping with equal lapping force applied to each tooth.

Other objects and many of the attendant advantages of this invention will be readily appreciated as the same becomes better understood by reference to the follow-

DESCRIPTION OF THE PREFERRED EMBODIMENT

Figure 1:
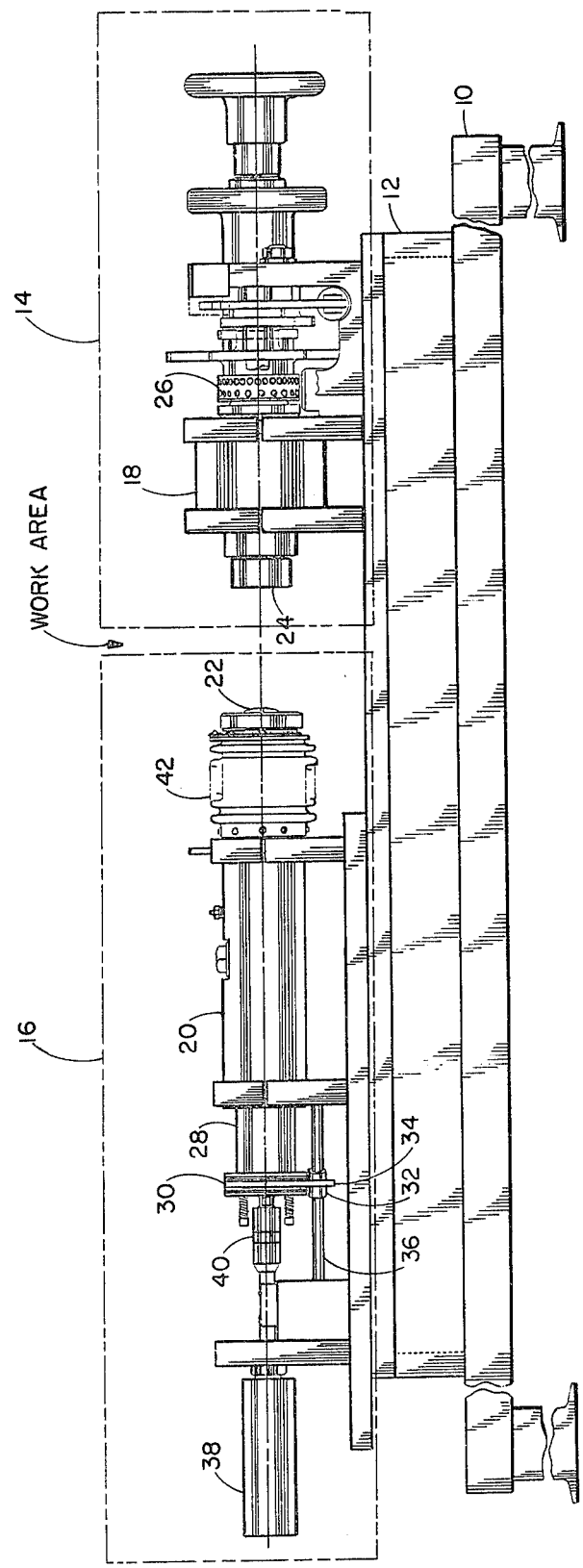
FIG. 1 shows the mechanical portion of the lapping machine.

Referring to FIG. 1, a table 10 or any equivalent platform is used as the basic support for the apparatus. A support frame 12 serves as the functional alignment bed for the apparatus. The area 14 encloses the headstock assembly. Area 16 encloses the complete tailstock assembly. The work area for lapping the spline gears occurs along the axis of the two assemblies between collets 22 and 24.

A few select components have been identified on the apparatus in FIG. 1 to help clarify the explanation. In the headstock assembly, a collet 24 is used for holding one workpiece. In the tailstock assembly, a collet 22 holds the mating workpiece, or, in the alternative, it may hold a tool piece for lapping the workpiece held in collet 24. The choice of which collets are to be used for mounting which spline gear workpieces or a toolpiece will be determined by the particular situation or discretion of the operator.

Shown in headstock assembly 14 is a housing 18 for a headstock workpiece axle. A detent cylinder 26 holds the rotational orientation of the workpiece in a fixed position during each lapping cycle.

Shown in tailstock assembly 16 are a bellows 42, a housing 20 for a tailstock reciprocating mainshaft 28, a clutch assembly 3, a "Lin-Act" alignment coupler 40, a pneumatic actuator cylinder 38, a slipclutch disc 34, an offset follower 32 and an offset follower bar 36.

During operation the workpiece held by the headstock assembly is firmly held rigid while the mating workpiece held in the tailstock assembly is slid in and out causing the mating workpieces to lap one another. This lapping action is caused by pneumatic cylinder 38 which through the "Lin-Act" coupler drives reciprocating main shaft 28. This lapping action proceeds for a preselected length of time.

Following this the workpiece in the tailstock is withdrawn from contact with the workpiece fastened in collet 24 in the headstock assembly. The headstock assembly then causes its workpiece to be rotated or indexed an angular movement about its axis equivalent to the spacing of one tooth. Upon completion of indexing, detent cylinder 26 in contact with a ball pin mechanism holds the orientation of the headstock workpiece firmly while the next cycle of reciprocal lapping of the workpieces occurs. These processes continue until lapping has occurred for each tooth of the headstock workpiece.

Not shown in FIG. 1 nor claimed are systems for supplying a lapping compound to flow over the workpieces while the lapping process proceeds. Also not shown would be guard plates mounted over the work area to protect the operator and to hold any splashing within the confined work area. The purpose of bellows 42 is specifically to protect and insulate the forward end of shaft 28 from being splattered with any fluid delivered to the work area.

Figure 2:
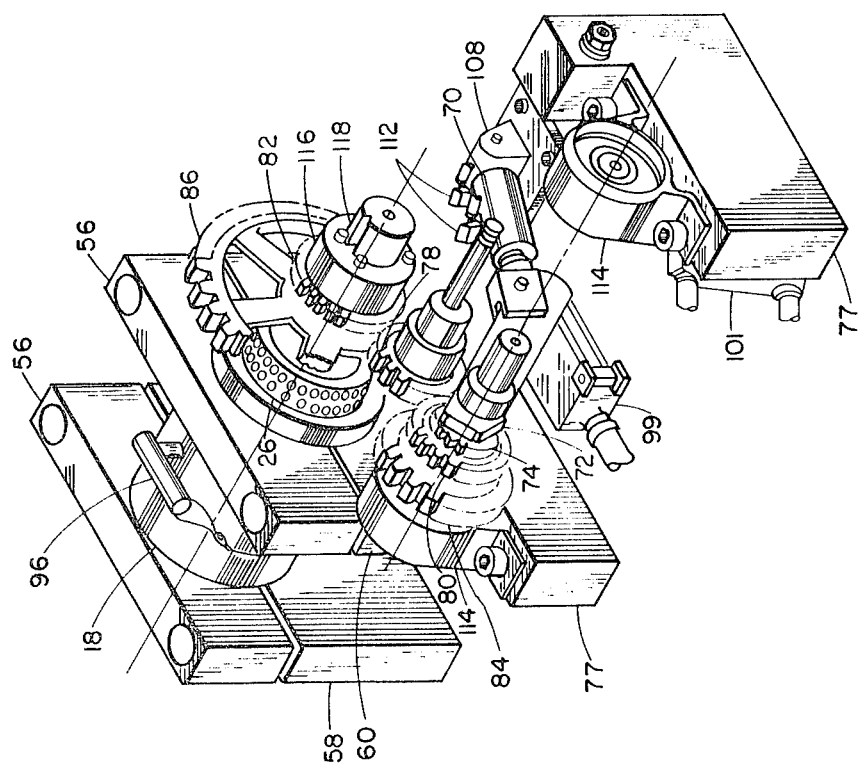
FIG. 2 is a semiexploded perspective of the headstock assembly structure.
Figure 5:
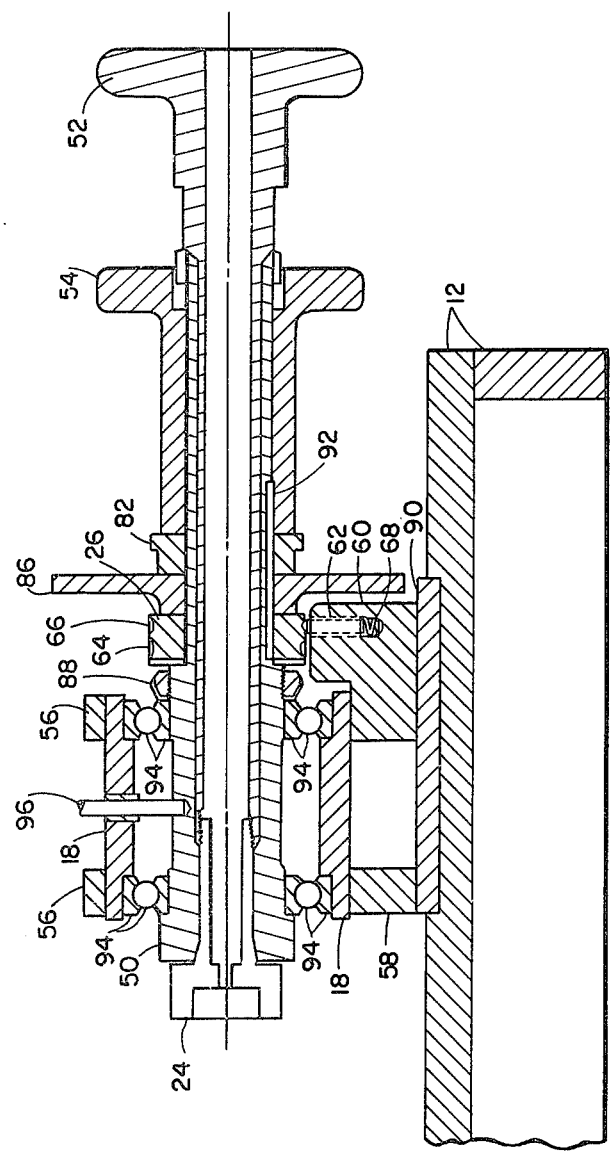
FIG. 5 is a cross-sectional view along the centerline of the headstock assembly.
Figure 6:
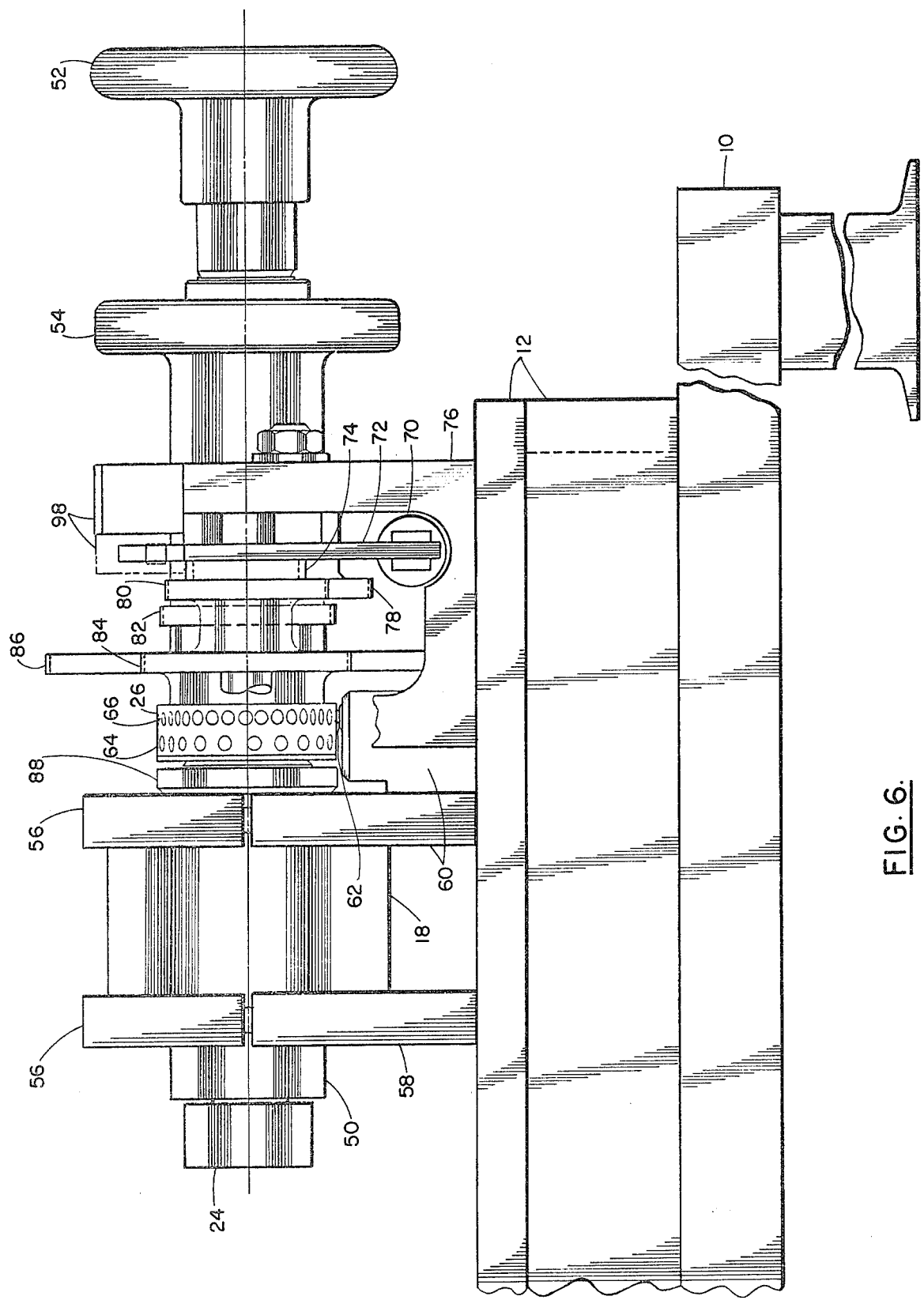
FIG. 6 shows the headstock assembly and the gear box portion with the indenting mechanism.
Figure 7:
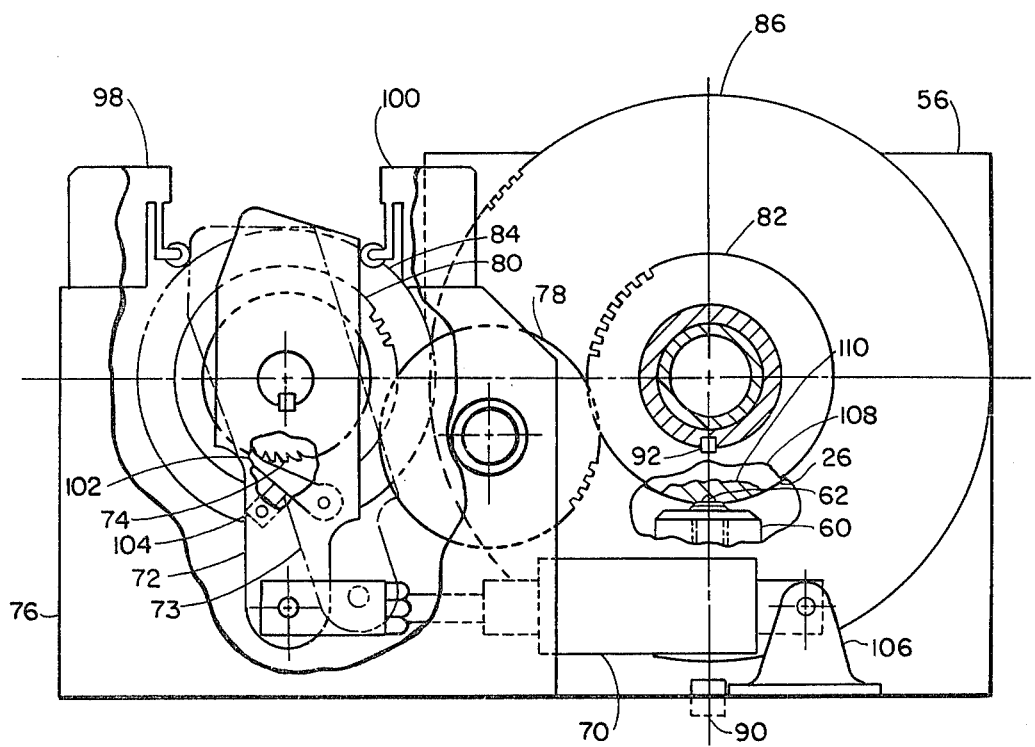
FIG. 7 is an end on view of the gear box mechanism showing also the pneumatic cylinder for indexing.

FIGS. 2, 5, 6 and 7 show more carefully the details of the headstock assembly for two particular embodiments. FIG. 2 shows a semi-exploded view of one embodiment. FIGS. 5, 6 and 7 represent a slightly variated embodiment. The difference basically focuses on the use of different housing brackets for a gear transmission system and index mechanism.

Referring to FIG. 2, headstock spindle housing 18 is mounted on a front support bracket 58 and a rear support bracket 60. Hold down brackets 56 are used to secure and fasten the housing to the brackets. In this embodiment an axle 118 is positioned along the working axis of the apparatus and proceeds through housing 18 to connect to collet 24. Upon this axle is mounted the detent cylinder 26, drive gears 82 and 86, and a retainer ring 116.

The transmission system includes a transfer gear 78, and gears 80 and 84. The purpose of the transmission system is to provide a means for aiding the indexing of the workpiece held in collet 24 by an angular distance equivalent to one tooth spacing between each lapping cycle. There are two combinations available for indexing in this embodiment. These combinations are governed by the number of indentations on detent cylinder 26. By shifting gears 86 and 82 longitudinally along the working axis the choice of indexing angles is effected as defined by the two rings of indentations on detent cylinder 26.

The motive force for indexing comes from a pneumatic cylinder 70 which is attached to the headstock assembly by a base 108. When activated, the pneumatic cylinder rotates an indexing lever 72 through a rotational distance defined by two pneumatic limit control switches 99 and 100. This causes a ratchet gear 74 to index one spacing where it is caught and held by a ratchet 102 and spring mechanism 104.

Gears 80, 84, ratchet gear 74 and indexing lever 72 are all mounted on an axle which is mounted between two bearing assemblies 114. Therefore, each index operation drives gears 80 and 84 which in turn may drive their respective mated gears on the working axis the proper rotational distance to index the workpiece one tooth space.

The two embodiments displayed in these FIGS. are identical except for differences shown in FIG. 2. Specifically, a bracket 77, bearing assemblies 114, limit control valves 99 and 101, shaft 118, and retainer 116 are unique to this particular embodiment. The alternative general embodiment is displayed in FIGS. 5, 6 and 7.

Referring to FIGS. 6 and 7, the second embodiment of the apparatus becomes clear. This embodiment uses a transmission and indexing mechanism housing bracket 76 to support the axle which carries gears 80 and 84, ratchet gear 74 and indexing lever 72. Also supported by this housing is an axle containing gear 78. For this embodiment, and as shown, pneumatic limit control switches 98 and 100 are mounted at the top of bracket 76 to be activated by the top edge of indexing lever 72.

The two limit positions for the indexing lever 72 are shown in FIG. 7. The solidly drawn lever 72 represents one limit position while phantom lever 73 represents the other limit position. Shown also is the pneumatic actuating cylinder 70 which drives the lever between its limiting positions when indexing the workpiece.

Figure 8:
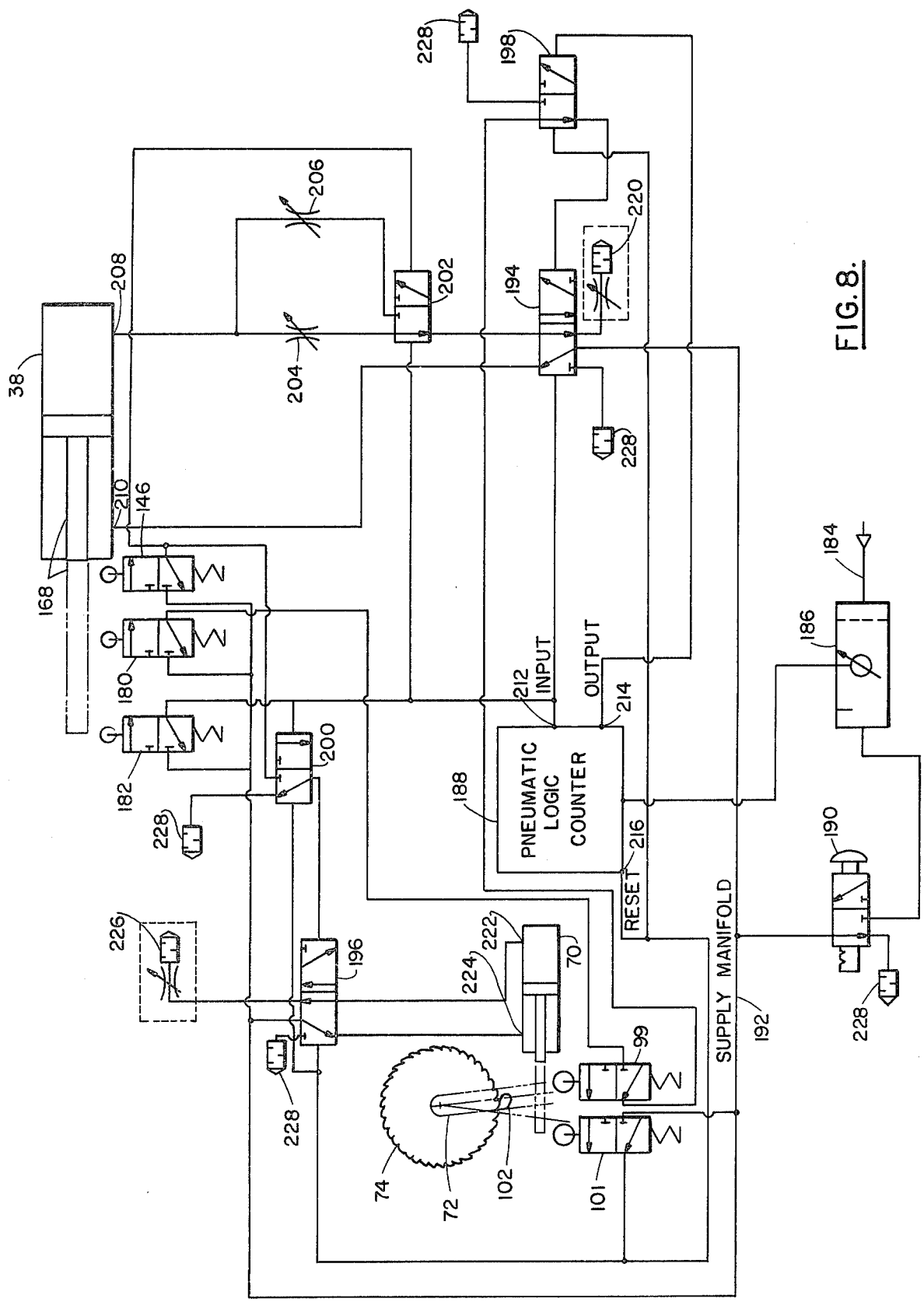
FIG. 8 is a schematic showing the pneumatic system and controls.

Referring to FIGS. 6, 7, and 8, the mechanism of the ball pin and detent wheel is clearly shown. The detent wheel 26 as explained before consists of separate rows, 64 and 66, of indentations matched to conform with two different tooth spacings for the particular workpieces being indexed. A row of these indentations is aligned with a ball pin 62. Ball pin 62 is mounted in support bracket 60. The tension or force necessary to hold the pin in any indentation on the detent wheel is provided by a spring 68. When the ball pin is properly forced against any indentation on the detent wheel the workpiece is caused to be firmly held during a lapping cycle. The force supplied by the ball pin and its spring is sufficient to hold the workpiece firmly during lapping operations but compliant enough to allow the indexing mechanism to rotate the axis the proper amount for the next lapping operation.

FIG. 5 and FIG. 6 best display the remaining particularities of this embodiment. Mounted concentric to and along the working axis are a headstock spindle shaft 50, collet 24, a collet chuck 52, a gear shifting spindle 54, gears 82 and 86, detent wheel 26, a retaining ring 88, and cylindrical ball bearing assemblies 94. Collet chuck 52 fastens to collet 24 by screw threads and provides the means for firmly fixing the workpiece in the collet. Gear shift spindle 54 provides the means for shifting gears 82 and 86 back and forth parallel to the work axis in order to slip the detent wheel from one row of indentations to the other row of indentations 64 or 66. Retainer ring 88 screws on to headstock spindle shaft 50 and firmly holds the shaft and ball bearing assemblies 94 within headstock housing 18. Support brackets 58 and 60 are shown. Hold down brackets 56 are also shown.

Alignment of the headstock assembly when fastened to support base 12 is accomplished through the use of a square plain parallel key 90. The positioning of this key is shown in FIG. 7 as well as in FIG. 5.

In addition FIGS. 2 and 5 show the option of placing a pin 96 which may be inserted through housing 18 into a hole in the headstock spindle shaft for firmly holding the spindle shaft during periods of attaching or removing workpieces.

A second square plain parallel key 92 is positioned along the headstock spindle shaft to fix the orientation of detent wheel 26, gears 82 and 86, and gear shifting spindle 54.

Figure 3:
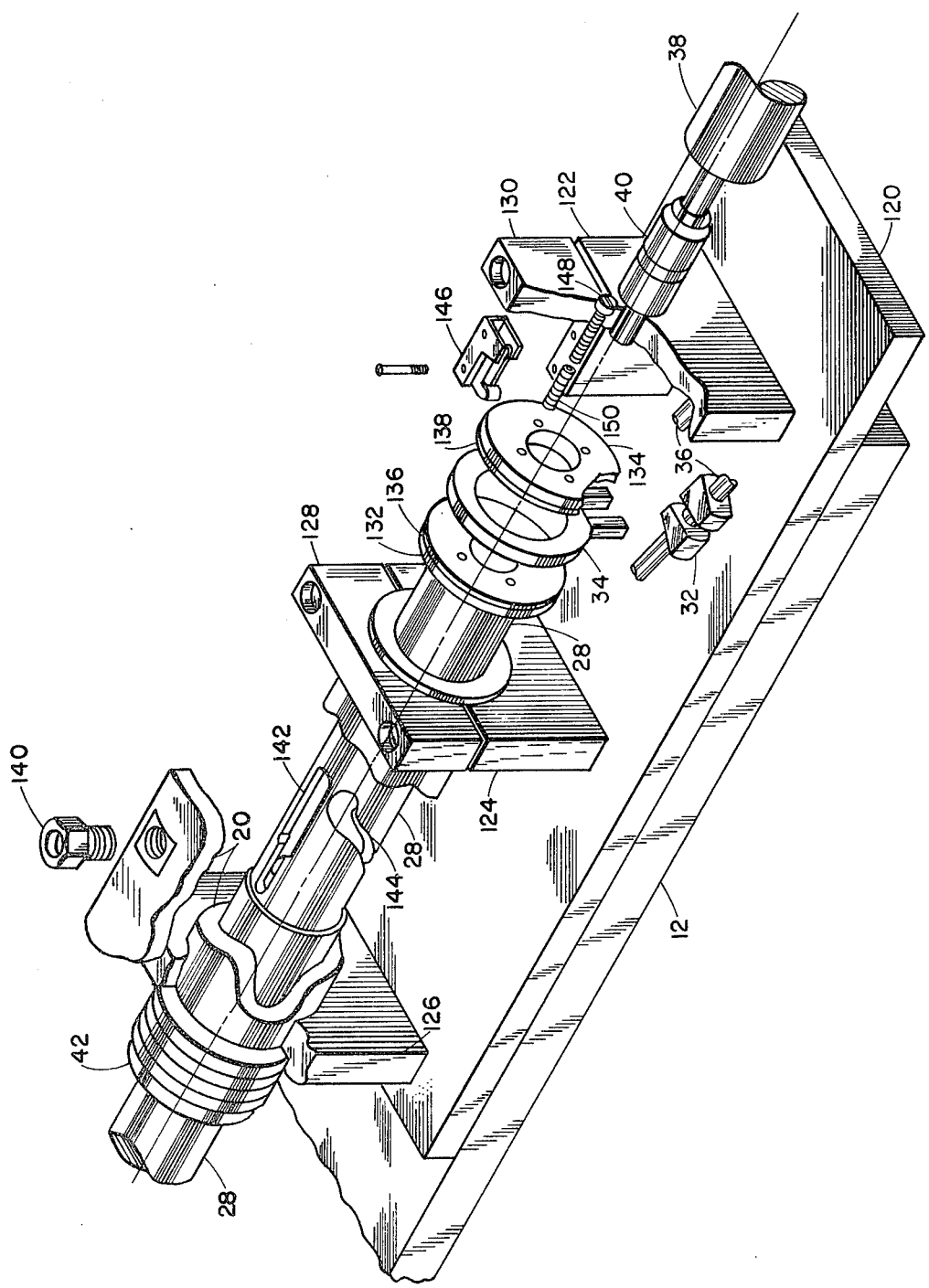
FIG. 3 is a semiexploded perspective of the construction and components of the tailstock assembly.
Figure 4:
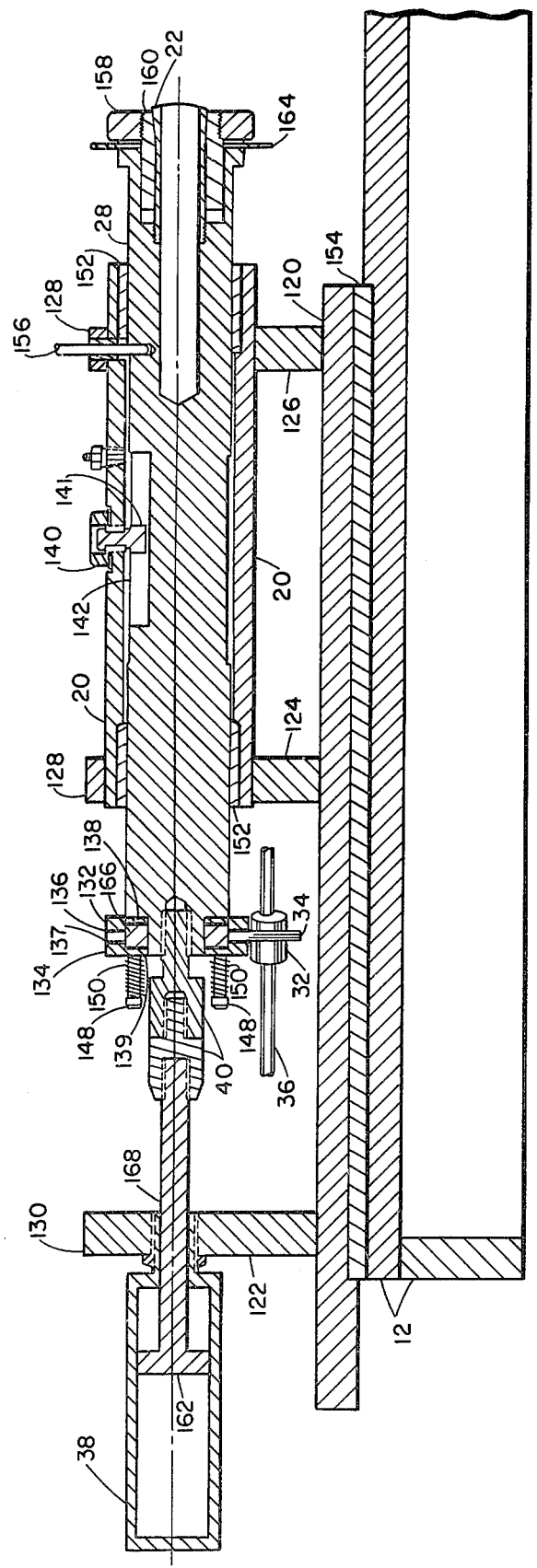
FIG. 4 is a cross-sectional view along the centerline of the tailstock assembly.

Details of the tailstock assembly are exhibited by FIGS. 3 and 4 as well as FIG. 1. It is to be noted that FIG. 3 presents a perspective of the tailstock assembly that has been rotated 180° relative to the perspectives displayed by all other FIGS.

With reference to these FIGS. a base plate 120 is seen to rest upon support frame 12. A square plain parallel key 154 aligns base plate 120 and the tailstock assembly so that the axis of the workpiece held by the tailstock assembly is colinear with the axis of the headstock assembly. A support bracket 124 and a hold-down bracket 128 fix the position of the rear portion of the tailstock housing to the base plate. A support bracket 126 along with a second hold-down bracket 128 fix the position of the front portion of the tailstock housing. A support bracket 122 along with a hold-down bracket 130 provide a bearing mount for a reciprocating piston rod 168. Piston rod 168 is given a reciprocating action along the axis of the workpiece by pneumatic cylinder 38. Also shown is a piston head 162 within the pneumatic cylinder. The force which causes the reciprocating lapping action originates with pneumatic cylinder 38 and is transmitted to the moving portions of the tailstock assembly through piston rod 168. The piston rod is connected to a reciprocating main shaft 28 through "Lin-Act" alignment coupler 40.

The reciprocating main shaft 28 is held and aligned by tailstock housing 20 through two slide spindle bearings 152 which are mounted at both ends of housing 20. Main shaft 28 contains two cam slots machined into its center portion. A linear cam slot 142 allows the lapping of straight spline parts. A spiral, helical cam slot 144 allows the lapping of helical spline gears. The helical slot is machined to the same lead angle rate as the helical spline gear.

A cam follower bearing 141, or CAMROL bearing, mounted in a specially machined bolt 140 rides in either slot at the choice of the machine operator. A portion of both slots is machined with added clearance to let the cam follower bearing float enough to allow a slight rotational movement necessary for applying lapping pressure to the workpieces.

Consistent lapping pressure is provided to the reciprocating main shaft by clutch assembly 30. Details of the clutch assembly are shown in FIGS. 3 and 4. The clutch assembly is composed of a front clutch pressure plate 132, a rear clutch pressure plate 134, a slip clutch disc 34, a clutch bearing 166, clutch discs 136, 137, 138 and 139, four machine bolts 148, and four springs 150.

The slip clutch disc 34 rides in a machined slot on offset follower 32 as the offset follower is guided along offset follower bar 36. During any linear motion of main shaft 28 the offset follower must move along the offset follower bar, and since the offset follower bar is oriented at an angle to the axis of the workpiece, this causes clutch disc 34 to rotate. The rotation of clutch disc 34 causes rotational forces to be applied through the clutch discs 136 and 137 to clutch pressure plates 132 and 134. Lapping pressure is created by this process which may be adjusted by springs 50 to apply more or less torque by turning the four machine screws 148.

FIG. 3 also shows a limit control valve 146 which is adjusted to help control the length of the reciprocating stroke.

The workpiece is held within main shaft 28 by collet 22, a collet sleeve 160 and a collet lock nut 158. The collet lock nut fastens down against a bellows plate 164 which provides means for fastening bellows 42 to the main shaft. A pin 156 is shown in FIG. 4 which penetrates hold down bracket 128 and inserts into a receiving hole drilled in main shaft 28. The purpose of this pin is to provide a firm means of holding main shaft 28 when physically attaching or removing a work piece to collet 22 in the main shaft.

Details of the pneumatic system are laid out in FIG. 8. The pneumatic system is the heart of the spline gear reciprocating lapping machine. It supplies the working energy and controls the timing for quickly lapping and indexing the spline parts.

Air enters an input connection 184 located on a combination filter, lubrication and regulator unit 186. Clean, pressure regulated, unlubricated air is tapped from the regulator and supplied to a pneumatic logic counter 188.

Air enters a supply manifold 192 when a palm button on valve 190 is pulled. The manifold supplies air to the input ports of four limit control valves 180, 182, 146 and 101 and two four way spool valves 194 and 196. The reciprocating cylinder 38 receives air from four way spool valve 194. With spool valve 194 in the position shown, the piston rod of cylinder 38 retracts. When the cylinder reaches the end of the lapping stroke, limit control valve 180 is actuated and sends an air pilot signal to limit control valve 99 and through a three way spool valve 198 to the pilot port of four way spool valve 194. The spool valve 194 shifts and allows air to pass through a three way spool valve 202 and a needle valve 204 to an extend port 208 in cylinder 38. Cylinder 38 fully extends and contacts limit control valve 182 which sends an air pilot signal to the pilot port of a three way valve 200 and 202, to an input port 212 in pneumatic logic counter 188, and to the pilot port of four way spool valve 194.

The spool of four way valve 194 shifts and routes air to a retract port 210 in cylinder 38. Exhaust air from the extend port of cylinder 38 is controlled by needle valve 204 and an exhaust speed control 220. The piston rod 168 of cylinder 38 now retracts and the cycle is repeated. This cycle laps the workpieces and continues until pneumatic logic counter 188 resets or until the palm button on control valve 190 is depressed.

The counter display on pneumatic logic counter 188 is preset by the operator to the number of strokes required for optimum lapping. When the number of lapping strokes has been reached, logic counter 188 is reset through a port 216 and sends an output signal through an output port 214 to the pilot port of a three way spool valve 198. The spool of valve 198 shifts position to block the pilot signal from limit control valve 180 to four way spool valve 194, and pneumatic cylinder 38 continues to retract. The limit control valve 146 is actuated when cylinder 38 reaches the fully retracted position. In the fully retracted position of cylinder 38 the splined work pieces are disengaged and rotated one spline tooth by indexing. The limit control valve 146 accomplishes this task by sending a pilot signal through three way valve 200, to the pilot ports of three way spool valve 202, and to four way spool valve 196. The spool of four way spool valve 196 shifts to send air to an extend port 222 of cylinder 70. The spool of three way spool valve 202 shifts to reroute air from needle valve 204 to a needle valve 206. When cylinder 70 extends, the headstock rotates the spline workpiece one spline tooth. When cylinder 70 is fully extended, limit control valve 101 is actuated and a pilot signal is sent to the pilot ports of four way spool valve 196, to three way spool valves 198 and 200, and to reset port 216 of logic counter 188. The spool of four way spool valve 196 shifts to send air to a retract port 224 of cylinder 70. When cylinder 70 is fully retracted, limit control valve 99 is actuated to pass air through three way spool valve 198 to the pilot port of four way spool valve 194.

The spool of four way spool valve 194 shifts and allows air to pass through three way spool valve 202 and needle valve 206 to the extend port of cylinder 38. Needle valve 206 is adjusted for slow extension of cylinder 36 to prevent damage to the splined work pieces during engagement.

Cylinder 36 continues to extend slowly until the end of the stroke is reached. When the cylinder is fully extended limit control valve 182 is actuated to send air to the pilot ports of three way spool valves 200 and 202, to an input (count) port 212 of logic counter 188, and to the pilot port of four way spool valve 194. The machine is now reset for reciprocating lapping action of the cylinder 38.

Lapping and indexing operations will continue automatically until the palm button on valve control 190 is pulled.

Clearly safety devices such as a shield designed to fit over the work area may be integrated into this pneumatic circuit. With such safety device integrated, the system can be set to automatically shut down should the safety shield be opened.

Also shown on FIG. 8 are ratchet gear 74, ratchet 102, and indexing lever 72 which is moved by the piston rod of actuating cylinder 70. Exhaust speed control valves 226 and 220 control the release of air exhausted from cylinders 70 and 38. Exhaust silencers 228 have been attached to the ports of several valves to likewise control the exhaust of used air from the pneumatic system.

Obviously, many modifications and variations of the present invention are possible in the light of the above teachings. It is therefore to be understood that within the scope of the appended claims the invention may be practiced otherwise than as specifically described.

We claim:

1. An apparatus for rapid, consistent and automatic lapping of involute and straight internal and external spline gears comprising:
    a support bed;
    a headstock assembly attachable to the support bed which includes:
        a headstock housing;
        means supported by the headstock housing for holding a first cylindrical workpiece in a manner that rotation may occur about the axis of the workpiece, said first workpiece being an involute or straight internal or external spline gear;
        means connected to the holding means for indexing the first cylindrical workpiece by controllably and automatically rotating it about its axis a preselected rotational distance at each indexing event;
        means linked to the holding means for maintaining firmly the orientation of the first workpiece during periods between indexing; and
        means connected to the indexing means for powering said indexing means;
    a tailstock assembly movably attachable to the support bed which includes:
        a tailstock housing;
        means supported by the tailstock housing for sustaining a second cylindrical workpiece with its axis colinear with the axis of the first cylindrical workpiece, and in a manner that reciprocating motion along this axis may occur, said second workpiece being a mating match to the involute or straight internal or external spline gear first workpiece whereby the workpieces can be mated for lapping their gears surfaces;
        means connected to the sustaining means for moving the sustaining means and second workpiece in a linear, controlled and reciprocating manner along the colinear axis of the mating first workpiece and second workpiece;

means in contact with any of the reciprocating elements for controlling the length of the stroke of the reciprocating motion of the moving means and the second workpiece;

means connected to the headstock assembly and the tailstock assembly for timing and coordinating in a preselected manner the rotation of the first workpiece by the indexing means and the reciprocating motion of the second workpiece by the moving means; and means attached to the controlling means for activating or deactivating the apparatus.

2. An apparatus according to claim 1 wherein the headstock housing further comprises:

a plurality of support mounts attached to the support bed;

a casing fastened to the plurality of support mounts for housing the holding means, said casing fitted with a plurality of bearings for holding the holding means in a manner that rotational movement may occur about the axis of the holding means;

first means for supporting the indexing means; and second means for supporting the maintaining means.

3. An apparatus according to claim 2 wherein the holding means further comprises:

a shaft mounted in the bearings of the casing and aligned with its axis colinear with the working axis of the workpiece;

a headstock collet attached to the workpiece end of the shaft for holding the first cylindrical workpiece.

4. An apparatus according to claim 3 wherein the indexing means comprises:

a ratchet gear coupled to the holding means, said ratchet gear maintaining its rotational orientation with the first workpiece throughout the lapping process;

an indexing lever connected to index the ratchet gear by rotating it a preselected angular increment which causes the first workpiece to be rotated about its axis by said preselected angular increment; and a ratchet attached to the first means for supporting which catches the ratchet gear after each index rotation and disallows said ratchet gear to rotate and reverse while the indexing lever returns to its rest position.

5. An apparatus according to claim 4 wherein the maintaining means comprises:

a detent wheel attached to the holding means in a manner for maintaining its rotational orientation with the first workpiece throughout the lapping process, said detent wheel containing hemispherical indentations in its outer cylindrical surface which are spaced at intervals equal to the preselected angular indexing increments along a circumferential circle on the outer cylindrical surface and perpendicular to the axis of the detent wheel;

a pin slidably housed in a well on the second means for supporting, said pin fitted to mate with any of the indentations on the detent wheel; and a spring seated below the pin in the well of the second means for supporting, and in contact with, the pin, said spring sufficiently stiff for applying pressure to said pin to firmly hold the pin in an indentation on the detent wheel between indexing operations and sufficiently pliable to allow the pin to be forced out of the indentation by the rotating detent wheel surface during indexing operation.

6. An apparatus according to claim 5 wherein the powering means for indexing comprises:

a first actuating cylinder fastened to the second means for supporting the indexing means; and a connecting bracket fastened between the ratchet lever and the first actuation cylinder for transmitting the drive force from the actuating cylinder to the ratchet lever.

7. An apparatus according to claim 6 wherein the tailstock housing further comprises:

a base plate slidably attached to the support bed whereby colinear alignment of the working axis for the mating workpieces is maintained;

a support bracket mounted upon the base plate for supporting in alignment with the work axis the moving means;

a plurality of mounting brackets attached to the base plate for holding a housing for the sustaining means;

a sustaining means housing, said housing fitted with a plurality of bearings for slidably holding the sustaining means in colinear alignment with the working axis; and a cam roller bearing located on the inside of the cylindrical housing and fastened through the cylindrical housing by a cam roller bearing bolt.

8. An apparatus according to claim 7 wherein the sustaining means further comprises:

a mainshaft slidably held by the sustaining means housing bearings, said mainshaft further including:

a plurality of pattern slots machined into the cylindrical surface of the mainshaft, each slot patterned to receive the cam roller bearing, said slots and cam roller bearing working together during the reciprocating action to guide the mainshaft according to the slot pattern;

means attached to the mainshaft for generating a rotational torque on the mainshaft, said rotational torque being transmitted to the second workpiece during lapping thereby ensuring that consistent lapping pressure is provided between the workpieces; and a collet attached to the workpiece end of the mainshaft for holding the second cylindrical workpiece with its axis colinear with the work axis, said workpiece being a mating match to the involute or straight internal or external spline gear first cylindrical workpiece attached to the headstock assembly whereby both pieces can be reciprocally mated for lapping the gear surfaces of the workpieces.

9. An apparatus according to claim 8 wherein the moving means comprises:

a second actuating cylinder fixed to the support bracket upon the base plate, said actuating cylinder providing the driving force for the reciprocating action of the main shaft during lapping operations; and a drive rod connected between the main shaft and the actuating cylinder.

10. An apparatus according to claim 9 wherein the controlling means comprises:

a first limit control valve adjusted to detect the complete extension point for the lapping cycle; and a second limit control valve to detect the full retraction position for the lapping cycle.

11. An apparatus according to claim 10 wherein the timing and coordinating means is a pneumatic system further comprising:

an input supply of clean, pressure regulated, unlubricated air;

a combination filter, lubrication and regulator unit which is connected to receive and condition the input air;

a supply manifold connected to receive conditioned air from the regulator unit;

a programmed system of pneumatic spool valves connected to receive air from the supply manifold, said valves being preset to control the transmission of the air in predetermined ways whereby control and timing of the indexing and lapping operations is accomplished;

a pneumatic logic counter connected to receive air from the regulator unit at preselected times, and from the programmed system of pneumatic spool valves for counting the number of lapping cycles, said counter also outputting air signals at preselected times to the programmed system to participate in the control operations; and a plurality of exhaust valves connected in a preselected manner to the programmed system of pneumatic spool valves to allow for release of air at preset times.

12. An apparatus according to claim 11 wherein the activating means comprises:

an on-off pneumatic valve attached to the input of the pneumatic system for activating or deactivating the flow of air through the system.

13. An apparatus according to claim 12 wherein the first and second actuating cylinders comprise:

pneumatic air piston cylinders, said cylinders being connected to receive and exhaust controlled air signals from the pneumatic air system.

14. An apparatus according to claim 13 wherein the means for applying torque comprises:

a first clutch pressure plate of annular disc shape mounted with one annulus surface against the end opposite the collet end of the mainshaft, said pressure plate's inner cylindrical surface fitted over a cylindrical shoulder on the end of the main shaft;

a first clutch friction disc of annular shape and mounted in contact with the other annulus surface of the first clutch pressure plate, said friction disc's inner cylindrical surface fitted over the cylindrical shoulder on the end of the mainshaft;

a clutch bearing of a cylindrical annular shape inserted to fit with its inner cylindrical surface over the cylindrical shoulder on the end of the mainshaft, said bearing making contact with the other annulus surface of the first clutch friction disc;

a slip clutch disc of annular shape with a slotted tab protruding radially from a portion of the outer edge, said slip clutch disc mounted in contact with the other annulus surface of the first clutch friction disc and with the slip clutch disc's inner cylindrical surface slidably fitted over the outer cylindrical surface of the clutch bearing;

a second clutch friction disc of annular shape and mounted in contact with the other annulus surface of the slip clutch disc and the clutch bearing, said second clutch friction disc's inner cylindrical surface fitted over the cylindrical shoulder on the end of the mainshaft;

a second clutch pressure plate of annular disc shape and mounted in contact with the other annulus surface of the second clutch friction disc, said second pressure plate's inner cylindrical surface fitted over the cylindrical shoulder on the end of the mainshaft;

machine bolts inserted in holes through the clutch pressure plates, the clutch friction discs, the clutch bearing, and into the mainshaft;

springs placed between the head of the inserted machine bolts and the face of the second clutch pressure plate, said springs providing compressive pressure for establishing proper clutch disc pressure when the machine bolts are adjusted;

an offset follower of cylindrical shape and slotted to slidably receive the slotted protuberance on the slip clutch disc; and an offset follower rod which slides through an axial hole through the offset follower, said offset follower rod being rigidly installed to the tailstock housing in a manner that its axis is at an angle to the working axis of the lapping process thereby causing the offset follower to move at an angle to the working axis direction as the mainshaft moves along the working axis during a lapping process, and consequentially causing the slip clutch disc to twist about the working axis to transfer a torque through the clutch components to the mainshaft.

* * * * *